United States Patent [19]

Peters

[11] Patent Number: 5,513,375
[45] Date of Patent: Apr. 30, 1996

[54] SYSTEM FOR COMPENSATING DATA RATE BETWEEN A STORAGE DEVICE AND A DATA COMPRESSION PROCESSOR USING A BUFFER MEMORY MAPPED TWICE INTO CONTIGUOUS ADDRESS SPACE OF A HOST PROCESSING UNIT

[75] Inventor: Eric C. Peters, Carlisle, Mass.

[73] Assignee: Avid Technology, Inc., Tewksbury, Mass.

[21] Appl. No.: 234,713

[22] Filed: Apr. 28, 1994

Related U.S. Application Data

[63] Continuation of Ser. No. 807,269, Dec. 13, 1991, abandoned.

[51] Int. Cl.[6] .......................... G06F 15/167; G06F 13/38
[52] U.S. Cl. .................. 395/846; 395/872; 395/250; 358/444; 364/DIG. 1; 364/239; 364/242.31
[58] Field of Search .................................. 395/250, 163, 395/846, 872, 250; 348/384; 358/444

[56] References Cited

U.S. PATENT DOCUMENTS

| 3,813,485 | 5/1974 | Arps | 178/6.8 |
|---|---|---|---|
| 4,574,351 | 3/1986 | Dang et al. | 364/200 |
| 4,592,011 | 5/1986 | Mantellina et al. | 395/425 |
| 4,599,689 | 7/1986 | Berman . | |
| 4,800,524 | 1/1989 | Roesgen | 364/900 |
| 4,821,185 | 4/1989 | Esposito | 395/275 |
| 4,847,750 | 7/1989 | Daniel | 395/425 |
| 4,951,139 | 8/1990 | Hamilton et al. | 358/135 |
| 5,060,168 | 10/1991 | Jingu | 395/116 |
| 5,113,494 | 5/1992 | Menendez et al. | 395/163 |
| 5,138,642 | 8/1992 | McCroskey et al. | 378/19 |
| 5,151,997 | 9/1992 | Bailey et al. | 395/800 |
| 5,196,933 | 3/1993 | Henot | 358/136 |

FOREIGN PATENT DOCUMENTS

| 0185924 | 7/1986 | European Pat. Off. . |
|---|---|---|
| 0410382A3 | 1/1991 | European Pat. Off. . |
| 0449715A1 | 2/1991 | France . |
| 59-112327 | 6/1984 | Japan . |

OTHER PUBLICATIONS

A. S. Tanenbaum, "Operating Systems: Design and Implementation", Principles of I/O Hardware, Sec. 3.1, 1987, pp. 110–116.

Tamitani et al., "An Encoder/Decoder Chip Set for the MPEG Video Standard"—proceedings of ICASSP–92 vol. 5, pp. V–661–V–664.

Bolton et al., "A complete Single–Chip Implementation of the JPEG Image Compression Standard", Proceedings of the IEEE 1911 Custom Integrated Circuits Conference May 1991 San Diego pp. 12.2.1–12.2.4.

Noda et al., "A JPEG Still Picture Compression LSI", Digest of 1991 Symposium on VLSI Circuits, Jun. 1991 pp. 33–34, XP299456.

D. Pryce, "Monolithic Circuits Expedite Desktop Video", Electrical Design News, vol. 36, No. 22, 24 Oct. 1991, Newton, MA, pp. 67–76 XP266596.

Artieri et al., "A Chip Set Core For Image Compression" IEEE Transactions On Consumer Electronics, vol. 36, No. 3, Aug., 1990, New York USA, pp. 395–402, EX162866.

Yashima et al., "100 Mbit/s HDTV Transmission using a High Efficiency Codec", Signal Processing of HDTV II, 1990, pp. 579–586.

*Primary Examiner*—Thomas C. Lee
*Assistant Examiner*—D. Dinh
*Attorney, Agent, or Firm*—Wolf, Greenfield & Sacks

[57] ABSTRACT

A data buffer that compensates the differences in data rates, between a storage device and an image compression processor. A method and apparatus for the real time indexing of frames in a video data sequence.

18 Claims, 3 Drawing Sheets

SYSTEM FOR COMPENSATING DATA RATE BETWEEN A STORAGE DEVICE AND A DATA COMPRESSION PROCESSOR USING A BUFFER MEMORY MAPPED TWICE INTO CONTIGUOUS ADDRESS SPACE OF A HOST PROCESSING UNIT

This application is a continuation of application Ser. No. 07/807,269, filed Dec. 13, 1991 now abandoned.

BACKGROUND OF THE INVENTION

This invention relates to hardware designs coupled with software-based algorithms for capture, compression, decompression, and playback of digital image sequences, particularly in an editing environment.

The idea of taking motion video, digitizing it, compressing the digital datastream, and storing it on some kind of media for later playback is not new. RCA's Sarnoff labs began working on this in the early days of the video disk, seeking to create a digital rather than an analog approach. This technology has since become known as Digital Video Interactive (DVI).

Another group, led by Phillips in Europe, has also worked on a digital motion video approach for a product they call CDI (Compact Disk Interactive). Both DVI and CDI seek to store motion video and sound on CD-ROM disks for playback in low cost players. In the case of DVI, the compression is done in batch mode, and takes a long time, but the playback hardware is low cost. CDI is less specific about the compression approach, and mainly provides a format for the data to be stored on the disk.

A few years ago, a standards-making body known as CCITT, based in France, working in conjunction with ISO, the International Standards Organization, created a working group to focus on image compression. This group, called the Joint Photographic Experts Group (JPEG) met for many years to determine the most effective way to compress digital images. They evaluated a wide range of compression schemes, including vector quantization (the technique used by DVI) and DCT (Discrete Cosine Transform). After exhaustive qualitative tests and careful study, the JPEG group picked the DCT approach, and also defined in detail the various ways this approach could be used for image compression. The group published a proposed ISO standard that is generally referred to as the JPEG standard. This standard is now in its final form, and is awaiting ratification by ISO, which is expected.

The JPEG standard has wide implications for image capture and storage, image transmission, and image playback. A color photograph can be compressed by 10 to 1 with virtually no visible loss of quality. Compression of 30 to 1 can be achieved with loss that is so minimal that most people cannot see the difference. Compression factors of 100 to 1 and more can be achieved while maintaining image quality acceptable for a wide range of purposes.

The creation of the JPEG standard has spurred a variety of important hardware developments. The DCT algorithm used by the JPEG standard is extremely complex. It requires converting an image from the spatial domain to the frequency domain, the quantization of the various frequency components, followed by Huffman coding of the resulting components. The conversion from spatial to frequency domain, the quantization, and the Huffman coding are all computationally intensive. Hardware vendors have responded by building specialized integrated circuits to implement the JPEG algorithm.

One vendor, C-Cube of San Jose, Calif., has created a JPEG chip (the CL550B) that not only implements the JPEG standard in hardware, but can process an image with a resolution of, for example, 720× 488 pixels (CCIRR 601 video standard) in just 1/30th of a second. This means that the JPEG algorithm can be applied to a digitized video sequence, and the resulting compressed data can be stored for later playback. The same chip can be used to compress or decompress images or image sequences. The availability of this JPEG chip has spurred computer vendors and system integrators to design new products that incorporate the JPEG chip for motion video. However, the implementation of the chip in a hardware and software environment capable of processing images with a resolution of 640×480 pixels or greater at a rate of 30 frames per second in an editing environment introduces multiple problems.

For high quality images, a data size of 15–40 Kbytes per flame is needed for images at 720×488 resolution. This means that 30 frames per second video will have a data rate of 450 to 1200 Kbytes per second. For data coming from a disk storage device, this is a high data rate, requiring careful attention to insure a working system.

The most common approach in prior systems for sending data from a disk to a compression processor is to copy the data from disk into the memory of the host computer, and then to send the data to the compression processor. In this method, the computer memory acts as a buffer against the different data rates of the compression processor and the disk. This scheme has two drawbacks. First, the data is moved twice, once from the disk to the host memory, and another time from the host memory to the compression processor. For a data rate of 1200 Kbytes per second, this can seriously tax the host computer, allowing it to do little else but the data copying. Furthermore, the Macintosh computer, for example, cannot read data from the disk and copy data to the compression processor at the same time. The present invention provides a compressed data buffer specifically designed so that data can be sent directly from the disk to the buffer.

With the JPEG algorithm, as with many compression algorithms, the amount of data that results from compressing an image depends on the image itself. An image of a lone seagull against a blue sky will take much less data than a cityscape of brick buildings with lots of detail. Therefore, it becomes difficult to know where a flame starts within a data file that contains a sequence of frames, such as a digitized and compressed sequence of video. This creates particular problems in the playback from many files based on edit decisions. With fixed size compression approaches, one can simply index directly into the file by multiplying the frame number by the frame size, which results in the offset needed to start reading the desired frame. When the frame size varies, this simple multiplication approach no longer works. One needs to have an index that stores the offset for each frame. Creating this index can be time consuming. The present invention provides an efficient indexing method.

SUMMARY OF THE INVENTION

The data buffer of the invention compensates for the data rate differences between a storage device and the data compression processor of a digital image compression and playback unit. The data buffer interfaces to a host central processing unit, a storage device, a DMA address register, and a DMA limit register, and is mapped into the address space of the host computer bus. The data sequence is unloaded from the storage device into the data buffer, which is twice mapped into the address space of the host computer.

DESCRIPTION OF THE PREFERRED EMBODIMENT

Figure 1:
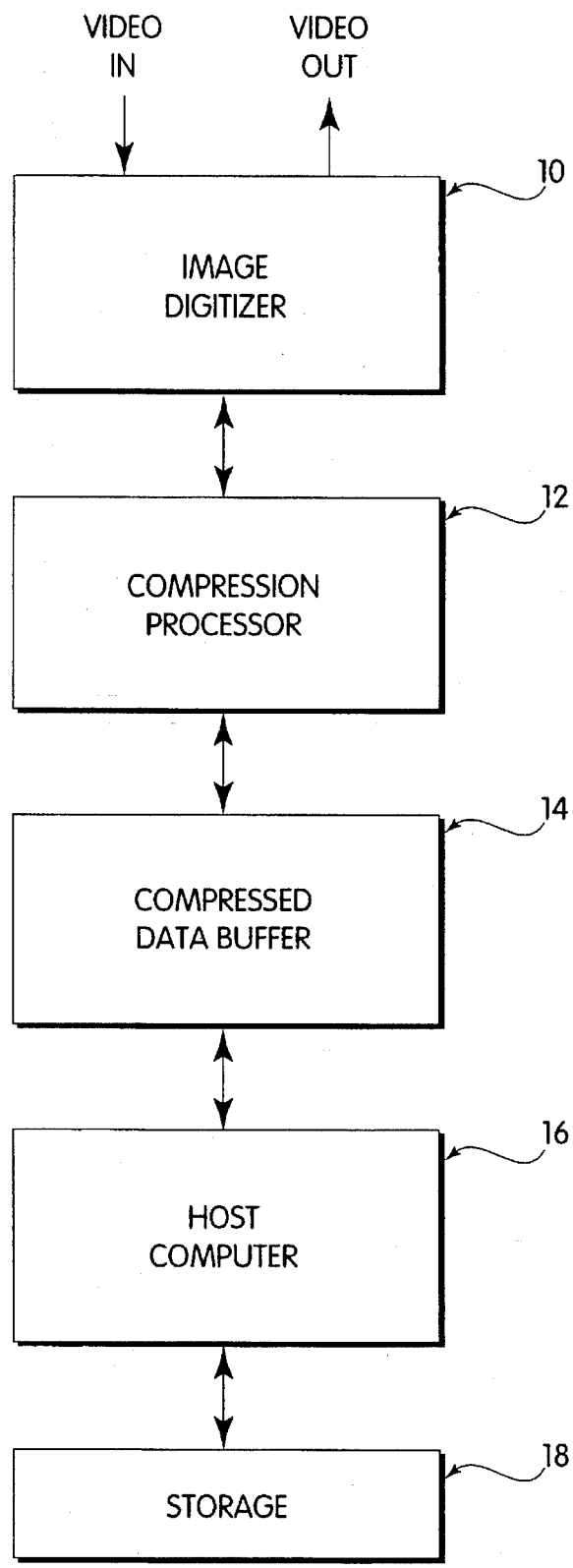
FIG. 1 is a block diagram of a video image capture and playback system implementing data compression.

A block diagram according to a preferred embodiment of a system for capture, compression, storage, decompression, and playback of images is illustrated in FIG. 1.

As shown, an image digitizer (frame grabber) 10, captures and digitizes the images from an analog source, such as videotape. Image digitizer 10 may be, for example, a TrueVision NuVista+ board. However, the NuVista+ board is preferably modified and augmented with a pixel engine as described "Image Digitizer Including Pixel Engine" by B. Joshua Rosen et al., filed Dec. 13, 1991, to provide better data throughput for a variety of image formats and modes of operation. Other methods of acquiring digitized video frames may be used, i.e., direct capture of digital video in "D-1" or "D-2" digital video formats.

A compression processor 12 compresses the data according to a compression algorithm. Preferably, this algorithm is the JPEG algorithm, introduced above. As discussed above, C-Cube produces a compression processor (CL550B) based on the JPEG algorithm that is appropriate for use as the compression processor 12. However, other embodiments are within the scope of the invention. The compression processor 12 may be a processor that implements the new MPEG (Motion Picture Experts Group) algorithm, or a processor that implements any of a variety of other image compression algorithms known to those skilled in the art.

The compressed data from the processor 12 is preferably input to a compressed data buffer 14 which is interfaced to a host computer 16 connected to a disk 18. The compressed data buffer 14 preferably implements a DMA process in order to absorb speed differences between the compression processor 12 and the disk 18, and further to permit data transfer between the processor 12 and the disk 18 with a single pass through a CPU of the host computer 16. (The details of the compressed data buffer 14 according to the present invention will be presented hereinbelow.) The host computer 16 may be, for example, an Apple Macintosh.

Buffer

As discussed above, a compressed data buffer is provided to take up the data rate differences between the disk 18 and the data compression processor 12. In this way, data can be sent directly from the disk to the buffer, or vice versa, passing through the host CPU only once. One aviods copying the data from the compression hardware into the host's main memory before it can be written from there to the disk storage subsystem. This scheme cuts the CPU overhead in half, doubling data throughput.

Figure 2:
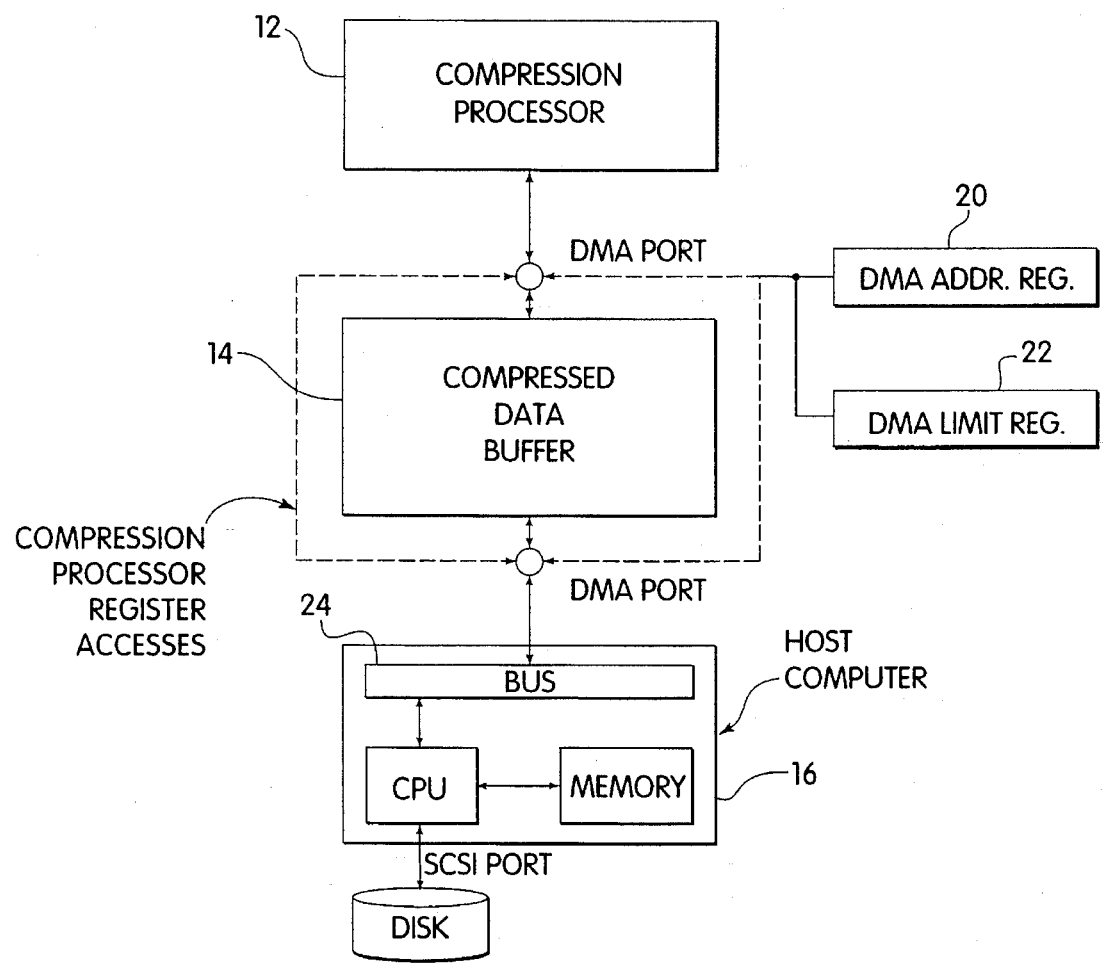
FIG. 2 is a schematic diagram of a compressed data buffer according to one embodiment of the invention.

A detailed schematic diagram of the storage end of the system of FIG. 1 is shown in FIG. 2. The compressed data buffer 14 is addressable. Associated with the buffer 14 are a DMA address register 20 and a DMA limit register 22. These registers and the buffer are seen by a CPU bus 24 of the host computer 16. Because the buffer 14 is addressable, standard file system calls can be used to request that the host computer 16 read data from the disk 18 and send it to the buffer 14, or read data from the buffer 14 and send it to the disk 18. The buffer 14 looks to the computer 16 like an extension of its own memory. No changes to the host computer disk read or write routines are required. For example, a single call to the operating system 16 of the host computer specifying a buffer pointer, a length to read, and a destination of the disk will effect a direct transfer of data from the buffer to the disk. By looking at the DMA address at the JPEG buffer, one can tell when the data is ready. By setting the DMA limit, feedback throttles the JPEG processor filling the buffer.

According to the invention, the buffer 14 is mapped in an address space of the host computer's bus 24 twice. Thus, the buffer is accessible in two contiguous locations. This has important ramifications in an editing environment during playback.

Figure 3:
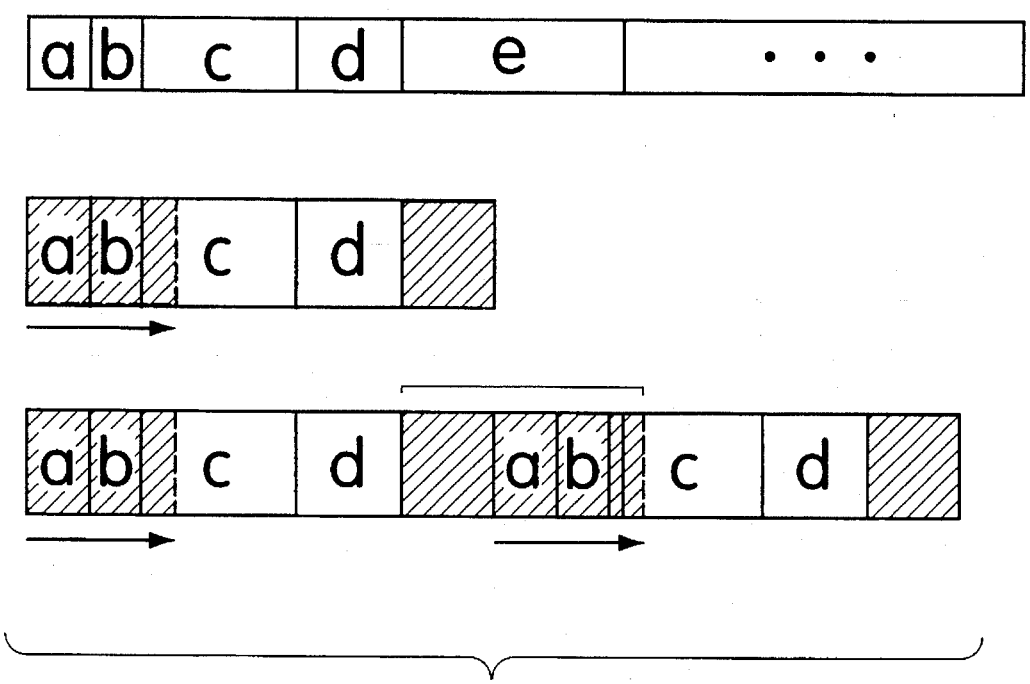
FIG. 3 is a schematic illustration of an edited sequence of images along with two mapping schemes of the compressed data buffer in the host system's bus.

FIG. 3 shows an edited sequence of images and a representation of a buffer that is mapped to the address space of the host computer's bus only once. The sequence is longer than the buffer. Each edit point in the sequence represents a point at which the data must be picked up at a new place on the disk.

During playback, the sequence will be read into the buffer from left to right, and the buffer will empty from left to right as the images are played. In the example illustrated, segments a, b, c and d fit into the buffer. Segment e does not however. For the buffer shown, therefore, two reads will be required to transfer segment e, since part of e will go at the end of the buffer, and the rest will go at the beginning of the buffer, as the beginning empties during playback. It is desirable to limit the number of reads as much as possible, as reads reduce the throughput of the system. The longer the reads, the more efficient the system.

This problem can be largely eliminated by mapping the buffer into the address space of the host computer's bus twice. As illustrated in FIG. 3, segment e now fits in contiguous memory in the buffer by overflowing into the second mapping. In this example, then, the double-mapping has allowed a single read, where two reads would have been required before. In general, for every read, you can read as much as is empty in the buffer. The space in the second mapping is only temporarily borrowed. In practice, the scheme is implemented by making the address of the second mapping the same as the address of the first except for a single bit, and by having the hardware of the system ignore this bit. So whether data is written to the first mapping or the second, it goes to the same place in the buffer.

This double mapping solves an important problem in a way that would not be possible without the buffer, since the computer's memory itself cannot in general be remapped to mimic the technique.

Frame Indexing

For any data compression scheme that results in compressed images with variable frame size, a method of frame indexing is required for finding frames to put together an edited sequence. The location of any frame is preferably instantly available.

The C-Cube chip described above provides a mechanism for creating an index by allowing the user to specify that a marker code be placed at a specified location in every frame. Therefore, a marker code can be placed at the beginning or end of every frame. In prior approaches, a program has been written to sequentially scan the file containing a sequence of images on a disk, and find and remember the location of each marker code. This is a post processing approach and is time consuming.

According to the frame indexing method of the invention, the image digitizer is programmed to generate an interrupt to the CPU of the host computer at every frame.[1] As the compression processor is putting data in the compressed data buffer, each time the CPU detects an interrupt it notes the location of the pointer in the buffer. By keeping track of the number of times the pointer has been through the memory, and the number of bytes the pointer is into the memory at each interrupt, the CPU can keep a table in memory of the position, or more preferably, the length of each frame. This table can be dumped to the disk at the end of the file, thereby providing the location of every frame in the file.

[1] Another prior approach is to use a fast processor or special purpose hardware to recognize and record the position of the marker code on the fly.

The table of frame locations does not solve all problems, however. Retrieving this information as needed during playback of an editted sequence is prohibitively time consuming. The solution is to make only that information necessary for a given edited sequence available to the CPU. The required information is the beginning and end of each segment of the sequence.

According to the invention, a data structure representing an edited sequence is generated at human interaction time during the editing process. Each time a user marks an edit point, an item is added to the list. By including in the list two fields representing the locations of the beginning of first and end of last frames in a segment, this information will be readily available at playback time. Since this prefetching of index values occurs during human interaction time, it does not create a bottleneck in the system.

The CPU can also be alerted whenever the frame sizes are getting too large for the system to handle. Compensating mechanisms can be triggered into action. One example of such a mechanism is the quality adjustment method disclosed in copending application "Quantization Table Adjustment" by Eric C. Peters filed Dec. 13, 1991. This adjustment reduces frame size (at the expense of quality).

It will be clear to those skilled in the art that a buffer according to the invention can be simply designed using programmable array logic and memory chips.

What is claimed is:

1. A method for compensating for data rate differences between a storage device and a data compression processor and for transferring data between the storage device and the data compression processor, comprising the steps of:

providing a data interface linking an addressable data buffer, a host processing unit, and the storage device, the host processing unit including an address space; and mapping the data buffer twice into the address space of the host processing unit, to provide a contiguous buffer memory; and transferring data between the data buffer and the storage device by passing the data through the host processing unit only once.

2. A method as claimed in claim 1, further comprising the step of direct memory access transferring the data from the data buffer to the compression processor.

3. A method as claimed in claim 1, further comprising the step of direct memory access transferring data from the compression processor to the data buffer.

4. The method according to claim 1, wherein the step of transferring the data between the compressed data buffer and the storage device is accomplished by placing the data on the data interface, only once.

5. The method according to claim 1, wherein the step of transferring the data between the storage device and the compressed data buffer is accomplished with only a single call to the host processing unit thereby resulting in only a single read operation from the storage device.

6. The method according to claim 5, wherein the single read operation may be initiated anywhere in the stored data, on the storage device, and need not be initiated at the beginning of the stored data.

7. A system for compensating for data rate differences between a storage device and a data compression processor comprising:

a host control processing unit including a bus having an address space and a local memory;

an addressable compressed data buffer including a first port and a second port, the first port being coupled to the data compression processor wherein the data buffer is twice mapped into the address space of the host control processing unit to provide a contiguous buffer memory;

a direct memory access address register connected to the data buffer, which stores data addresses of a location within the data buffer;

a direct memory access limit register connected to the data buffer which limits a direct memory access transfer of data between the compression processor and the compressed data buffer;

a data interface linking the second port of the data buffer, the host control processing unit, the local memory and the storage device;

whereby a data transfer between the storage device and the addressable compressed data buffer is accomplished by passing the data through the host control processing unit only once, and without storing the data in the local memory of the host control processing unit.

8. The system set forth in claim 7, where the data buffer is configured to store digital video image data.

9. The system set forth in claim 8, where the compression processor is configured to compress digital video image data.

10. The system set forth in claim 8, where the compression processor is configured to compress image data by:

computing a discrete transform of the image data to create a plurality of coefficients corresponding to frequencies;

quantizing the plurality of coefficients to create a plurality of quantized coefficients; and coding the quantized coefficients to create a plurality of encoded coefficients.

11. The system according to claim 7, wherein the data is transferred between the storage device and the addressable compressed data buffer by placing the data on the interface only once.

12. The system according to claim 7, wherein the data is transferred between the storage device and the addressable compressed data buffer by reading the data, from the storage device, with only a single call to the host processing unit, thereby resulting in only a single read operation of the storage device.

13. The system according to claim 12, wherein the single read operation may be started anywhere in the stored data and need not be started at a beginning of the stored data.

14. The system according to claim 7, wherein the host control processing unit further comprises a central processing unit, coupled to the data interface, which controls the data transfer between the storage device and the addressable compressed data buffer.

15. A system for transferring data between a data compression processor and a storage device, comprising:
- a controller unit including a bus having an address space;
- an addressable compressed data buffer which is twice mapped into the address space of the controller unit to provide a contiguous buffer memory;
- a data interface linking the addressable compressed data buffer, the controller unit, the storage device and the compression processor; and
- whereby a data transfer between the storage device and the data compression processor is accomplished by passing the data through the controller unit only once.

16. The system according to claim 15, wherein the data is transferred between the storage device and the data compression processor by placing the data on the data interface only once.

17. A system according to claim 15, wherein the data is transferred between the storage device and the data compression processor by reading the data, from the storage device with only a single call to the controller unit, thereby resulting in only a single read operation of the storage device.

18. A system according to claim 17, wherein the single read operation may be started anywhere in the stored data and need not be started at a beginning of the stored data.

* * * * *